(12) United States Patent
Guyette (10) Patent No.: US 10,955,223 B1
(45) Date of Patent: Mar. 23, 2021

(54) FOLDING SHIELD

(71) Applicant: Innovative Armor Systems, Ltd. Co., Newport, VT (US)

(72) Inventor: Jeremy Guyette, Newport, VT (US)

(73) Assignee: INNOVATIVE ARMOR SYSTEMS, LTD. CO., Newport, VT (US)

( * ) Notice: Subject to any disclaimer, the term of this patent is extended or adjusted under 35 U.S.C. 154(b) by 0 days.

(21) Appl. No.: 16/504,600

(22) Filed: Jul. 8, 2019

Related U.S. Application Data (60) Provisional application No. 62/694,463, filed on Jul. 6, 2018.

(51) Int. Cl.
| | |
|---|---|
| *F41H 5/08* | (2006.01) |
| *F41H 5/013* | (2006.01) |
| *F41H 5/24* | (2006.01) |
| *F16C 11/10* | (2006.01) |

(52) U.S. Cl.
CPC ............ *F41H 5/08* (2013.01); *F41H 5/013* (2013.01); *F41H 5/24* (2013.01); *F16C 11/10* (2013.01)

(58) Field of Classification Search
CPC ..... F41H 5/06; F41H 5/08; F41H 5/13; F41H 5/18; F41H 5/24
USPC ........................................ 89/36.07
See application file for complete search history.

(56) References Cited

U.S. PATENT DOCUMENTS

| | | | | |
|---|---|---|---|---|
| 1,273,371 A | * | 7/1918 | Hudziak | F41H 5/08 109/49.5 |
| 1,649,996 A | * | 11/1927 | Toth | F41H 5/08 2/2.5 |
| 2,020,702 A | * | 11/1935 | Russell | F41H 5/08 2/2.5 |
| 2,109,831 A | * | 3/1938 | Szalkay | F41H 5/06 109/49.5 |
| 2,316,055 A | * | 4/1943 | Davey | F41H 5/08 89/36.05 |
| 3,745,938 A | * | 7/1973 | Hathaway | F41H 5/08 109/49.5 |
| 4,412,495 A | * | 11/1983 | Sankar | F41H 5/08 109/49.5 |
| 4,843,947 A | * | 7/1989 | Bauer | F41H 5/08 89/36.05 |
| 5,377,577 A | * | 1/1995 | Bounkong | F41H 5/08 2/2.5 |
| 5,392,686 A | | 2/1995 | Sankar | |
| 6,691,601 B2 | * | 2/2004 | Cohen | F41H 5/06 109/49.5 |
| 6,807,890 B1 | * | 10/2004 | Fuqua | F41H 5/08 89/36.02 |
| 6,990,887 B1 | * | 1/2006 | O'Donnell | F41H 5/08 89/36.02 |

(Continued)

FOREIGN PATENT DOCUMENTS

KR    101915799 B1    12/2015

*Primary Examiner* — Stephen Johnson
*Assistant Examiner* — Benjamin S Gomberg
(74) *Attorney, Agent, or Firm* — Shawn Gordon; Dunkiel Saunders Elliott Raubvogel & Hand, PLLC (57) ABSTRACT

A folding ballistic shield is provided that has two panels connected along a vertical line that open to less than 180 degrees via an offset coupling mechanism such that the panels also overlap slightly to prevent any gap or ballistically weak area. A pair of grip handles and arm braces or supports on each panel allow users to more easily support the shield with either his or her left or right hand/arm.

19 Claims, 5 Drawing Sheets

(56) References Cited

U.S. PATENT DOCUMENTS

| | | | | |
|---|---|---|---|---|
| 7,404,352 B1* | 7/2008 | Hoffman | ............... | F41H 5/12 |
| | | | | 2/2.5 |
| 7,424,844 B2* | 9/2008 | Carter | ............... | F41H 5/08 |
| | | | | 89/36.05 |
| 7,520,206 B2* | 4/2009 | Baker | ............... | F41H 5/08 |
| | | | | 89/36.05 |
| 7,594,515 B2* | 9/2009 | Prock | ............... | F41H 5/08 |
| | | | | 135/117 |
| 7,716,748 B2* | 5/2010 | Dovner | ............... | F41C 33/0209 |
| | | | | 2/2.5 |
| 8,210,088 B1* | 7/2012 | Keyfauver | ............... | F41H 5/08 |
| | | | | 2/455 |
| 8,356,540 B2* | 1/2013 | Priebe | ............... | F41H 5/08 |
| | | | | 89/36.07 |
| 9,803,960 B2* | 10/2017 | Banducci | ............... | F41H 5/08 |
| 10,281,243 B2* | 5/2019 | Macias | ............... | F41H 5/08 |
| 2011/0005380 A1* | 1/2011 | Hogan | ............... | F41H 5/08 |
| | | | | 89/36.02 |
| 2012/0186435 A1* | 7/2012 | Garcia | ............... | F41H 5/08 |
| | | | | 89/36.07 |
| 2014/0238225 A1* | 8/2014 | Mickiewicz | ............... | F41H 5/08 |
| | | | | 89/36.07 |
| 2018/0120063 A1* | 5/2018 | Yakoub | ............... | F41H 5/08 |
| 2019/0226814 A1* | 7/2019 | Howell | ............... | F41H 5/013 |

\* cited by examiner

FOLDING SHIELD

RELATED APPLICATION DATA

This application claims the benefit of U.S. Provisional Application No. 62/694,463, titled "Folding Shield" and filed on Jul. 6, 2018, which is incorporated herein in its entirety.

FIELD OF THE INVENTION

The present invention generally relates to handheld shields. In particular, the present invention is directed to a handheld folding shield.

BACKGROUND

Various types of handheld ballistic shields are known, including shields that may be folded for ease or transport and storage, such as U.S. Pat. Nos. 3,745,938 and 5,392,686. However, there is a need for an improved handheld ballistic shield.

SUMMARY OF THE DISCLOSURE

It is an objective to provide a folding shield with a first panel having a user-facing face, a top edge, a bottom edge, an outward edge and an inward edge, the first panel including a grip handle and an arm support, the arm support being attached to the first panel below the grip handle and including a curved portion, wherein the curved portion is pivotable between a stowed position in which the curved portion aligned with the user-facing face and a use position in which the curved portion extends away from the user-facing face, and wherein the grip handle is not horizontal when the shield is in an upright position. A second panel has a second user-facing face, a second top edge, a second bottom edge, a second outward edge, and a second inward edge, the second panel including a second grip handle and a second arm support, the second arm support being attached to the first panel below the grip handle and including a second curved portion, wherein the second curved portion is pivotable between a stowed position in which the second curved portion aligned with the user-facing face and a use position in which the second curved portion extends away from the user-facing face, and wherein the second grip handle is not horizontal when the shield is in an upright position. A plurality of offset coupling devices connects the inward edge to the second inward edge such that the shield is continuously foldable from an open configuration in which an angle between the first panel and the second panel more than 100 degrees and less than 180 degrees and a folded configuration in which the user-facing face and the second user-facing edge are facing each other. The second arm support and the grip handle are configured and positioned such that, when the shield is in the open configuration and the second arm support is in the use position, when the user grasps the grip with the user's right hand the second arm support is in position to be placed over the user's right arm to further support the shield. Likewise, the arm support and the second grip handle are configured and positioned such that, when the shield is in the open configuration and the arm support is in the use position, when the user grasps the second grip with the user's left hand the arm support is in position to be placed over the user's left arm to further support the shield.

It is another objective to provide a folding shield comprising a first panel having an inside edge, a front side, and a back side, the first panel including a right-hand grip attached to the back side and a left arm support hingeably attached to the back side. A second panel has a second inside edge, a second front side, and a second back side, the second panel including a left-hand grip attached to the second back side and a right arm support hingeably attached to the second back side. The first panel and the second panel are coupled along the first inside edge and the second inside edge via a plurality of offset hinges such that the folding shield is configurable between an open position in which an angle between the first panel and the second panel is greater than 100 degrees and up to 180 degrees and a folded configuration in which the back side and the second back side face each other and are separated by less than 5 inches.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A folding ballistic shield is provided that can be placed in the unfolded, deployed configuration quickly and easily and that has an ergonomic handle system for ease of holding and carrying. The ballistic shield has two panels coupled together such that the shield can be quickly and easily articulated between an unfolded state and a folded state. In the unfolded state, the shield can be held and maneuvered by a user with one hand and forearm via ergonomically positioned hand grips and forearm supports. In the folded state, the shield can be placed in vehicles or otherwise more easily stowed and transported. The present invention thus provides law enforcement personnel with distinct advantages over presently available ballistic shields in terms of weight, ease of storage, speed of deployment, ergonomics, operational flexibility, weight, and ballistic protection in active shooter and other high threat environments.

Figure 1:
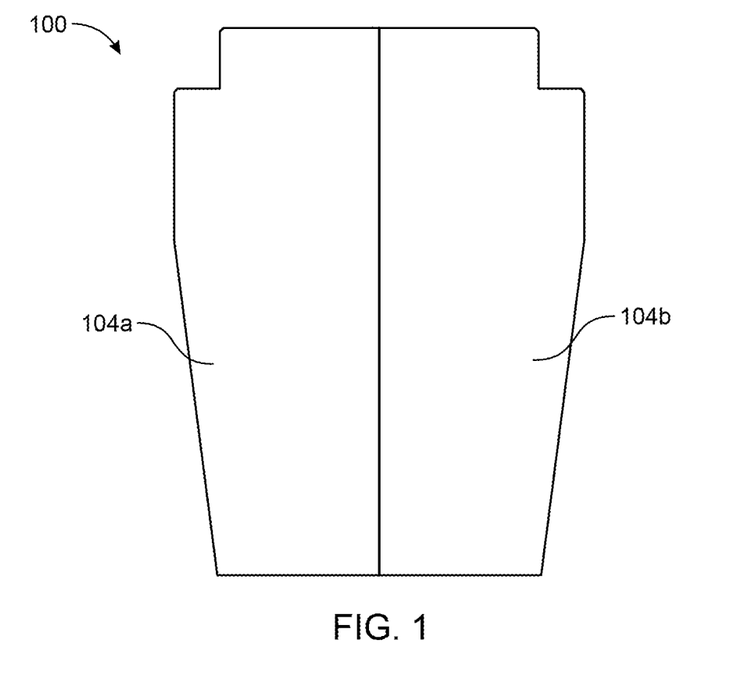
FIG. 1 is a front view of a foldable shield in an unfolded configuration according to an embodiment of the present invention.
Figure 2:
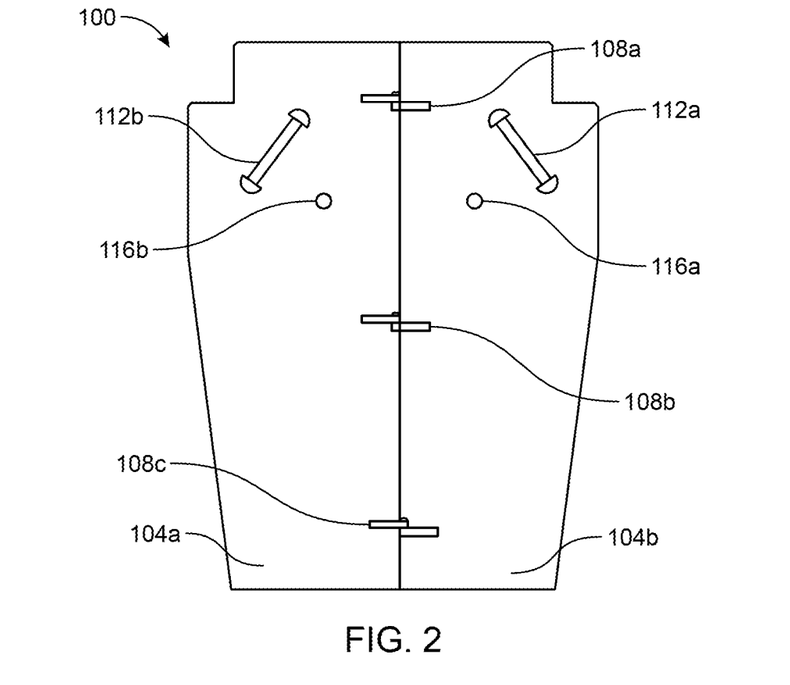
FIG. 2 is a rear view of the shield shown in FIG. 1.
Figure 3:
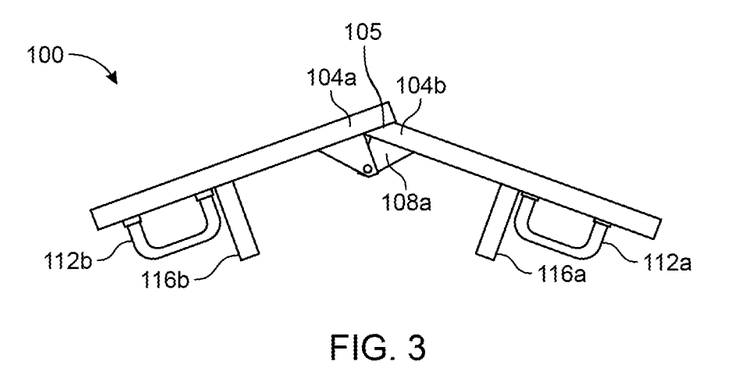
FIG. 3 is a top view of the shield shown in FIG. 1.
Figure 4:
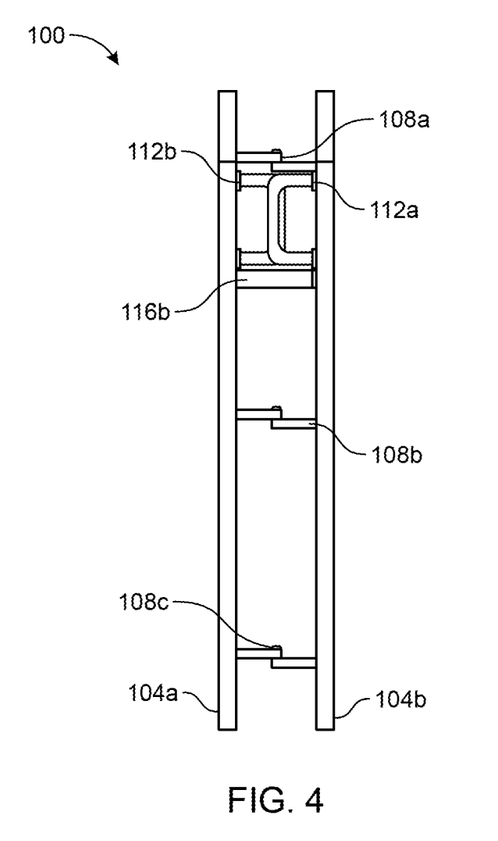
FIG. 4 is a rear view of the shield shown in FIG. 1 in a folded configuration.
Figure 5:
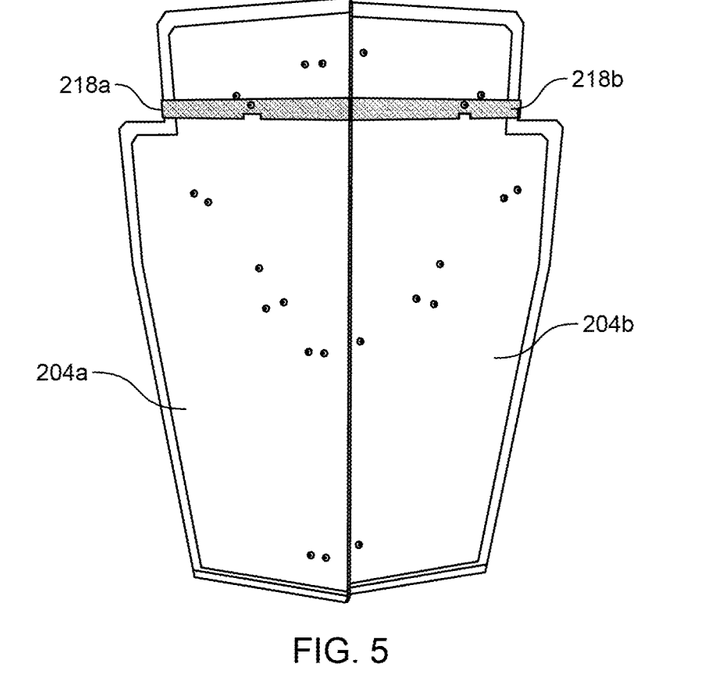
FIG. 5 a front view of a foldable shield in an unfolded configuration according to another embodiment of the present invention.

In an embodiment shown in FIGS. 1-4, a shield 100 includes two panels 104 (e.g., 104a, 104b) that are made of a ballistic shielding material, such as ultra-high molecular-weight polyethylene. Preferably, panels 104 are approximately mirror images of each other (for balance) and are coupled along a vertical edge. Any suitable method may be used to couple panels 104, including a plurality of offset hinges 108 (e.g., 108a-108c) as shown in FIG. 2. In a preferred embodiment, the coupling mechanism will allow panels 104 to be substantially parallel in the folded state (as seen in FIG. 4) and to form an angle less than 180 degrees when fully opened in the open state (as seen in FIG. 3). The slightly less than 180 degree configuration results from the coupling mechanism causing panels 104 to be slightly overlapping when shield 100 is in the open configuration, which avoids any gap or ballistically weak line being present at the junction of panels 104. As shown in FIG. 3, the front face of panel 104a overlaps panel 104b. It will be understood that panels 104 may be coupled in the opposite way such that the front face of the right side panel (right side is from the perspective of a user, i.e., 104b) overlaps the left side panel. The particular orientation would depend on user preference.

Each panel 104 includes a grip 112 (e.g., 112a, 112b) and a brace 116 (e.g., 116a, 116b). Grip 112 is positioned near the upper outer corner of panel 104 and preferably angled with respect to vertical, about 45 degrees for example. Grip 112 is sized and shaped to be grasped by a user's hand. Slightly beneath grip 112 and more toward the center of shield 100, brace 116 may be generally cylindrical (or other suitable shape) and sized and positioned such that brace 116 rests on the user's forearm, elbow, or upper arm when the user is holding grip 112. In operation, when a user grasps grip 112, e.g., grip 112a, with the left hand, the user's left arm will engage with brace 116 on the opposite panel 104, e.g., brace 116b. When using the right hand to hold the shield, a user would hold grip 112b of panel 104b with the right hand while the right arm engaged with brace 116a on panel 104a.

In the folded configuration, shield 100 may be as little as 3-4 inches in width, in part because offset hinges 108 allow opposing grips 112 and braces 116 to not interfere with the folding, that is, the outer portions of opposing members do not directly lineup with each other when the shield is in the folded configuration.

Figure 6:
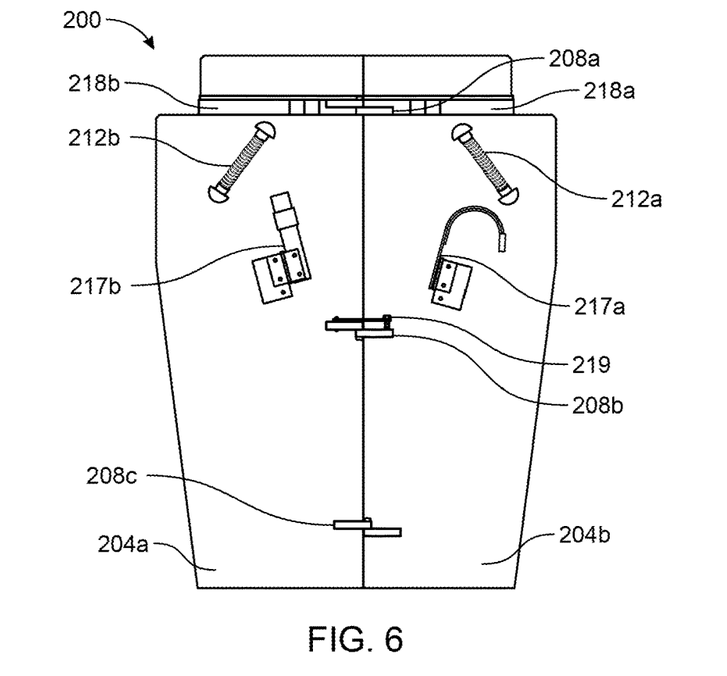
FIG. 6 is a rear view of the shield shown in FIG. 5.
Figure 7:
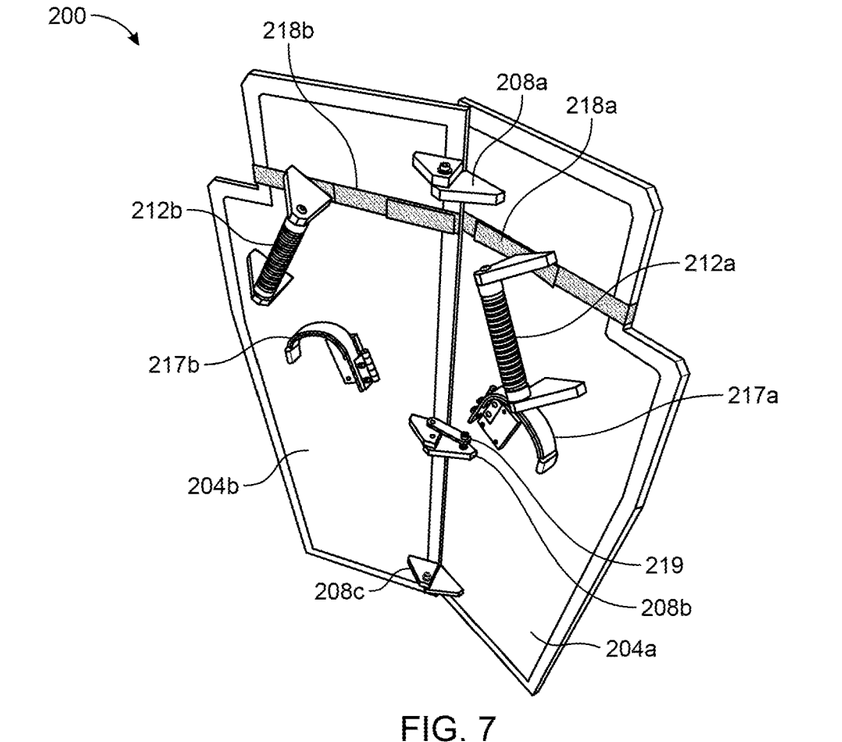
FIG. 7 is a perspective rear view of the shield shown in FIG. 5.
Figure 8:
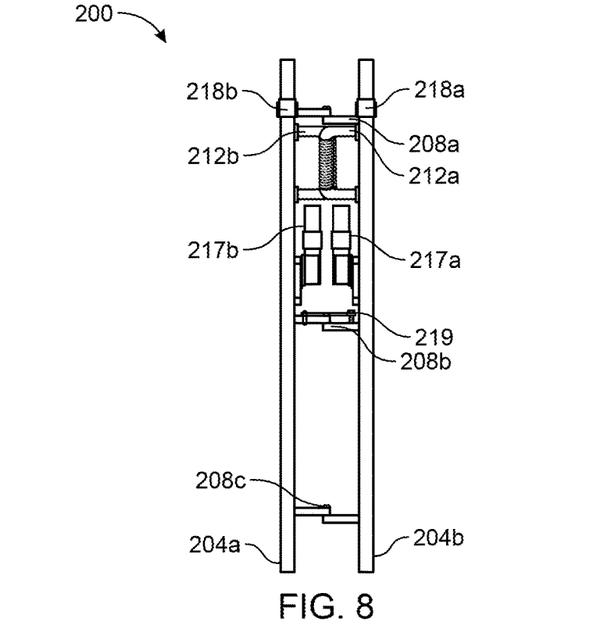
FIG. 8 is a rear view of the shield of FIG. 5 in the folded position.
Figure 9:
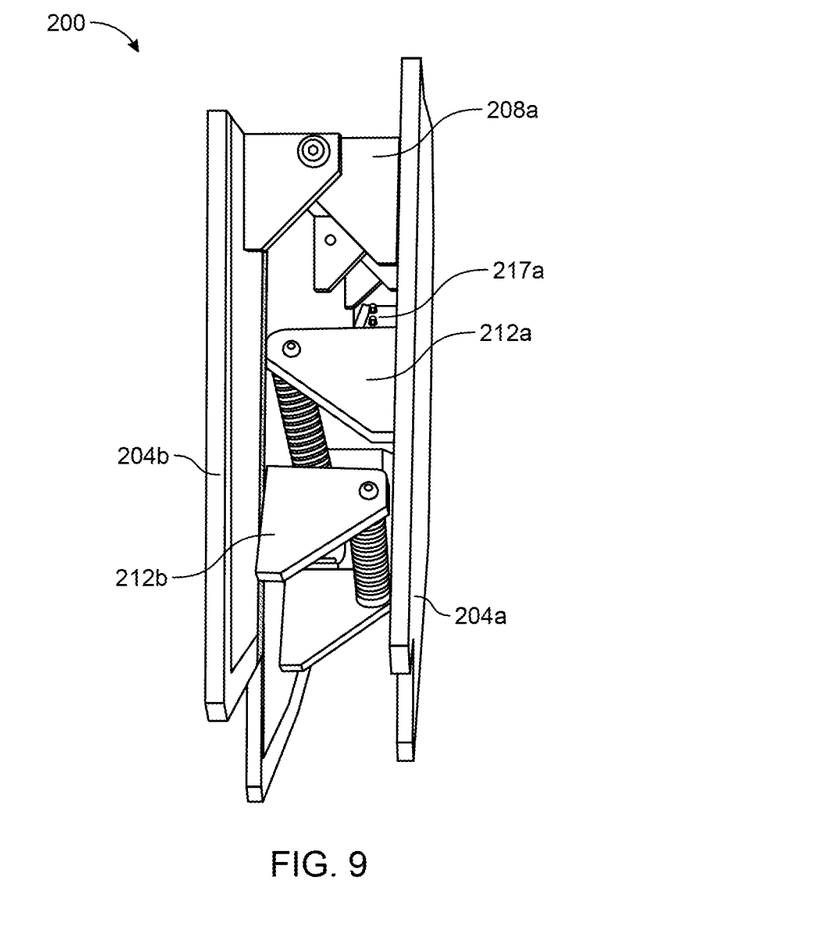
FIG. 9 is a top view of the shield of FIG. 5 in the folded position.

In another embodiment shown in FIGS. 5-9, a shield 200 includes two panels 204 (e.g., 204a, 204b) that are made of a ballistic shielding material, such as ultra-high molecular-weight polyethylene. Preferably, panels 204 are approximately mirror images of each other (for balance) and are coupled along a vertical edge. Any suitable method may be used to couple panels 204, including a plurality of offset hinges 208 (e.g., 208a-208c) as can be seen in FIGS. 6-7. In a preferred embodiment, the middle hinge, i.e., hinge 208b in FIG. 6, is mounted in an orientation that is opposite of the top and bottom hinges (in other words, "upside down"). The coupling mechanism will allow panels 204 to be placed in the folded state (as seen in FIGS. 8-9) and to form an angle less than 180 degrees when fully opened in the open state (as seen in FIG. 7 and FIG. 3 of another embodiment). A slightly less than 180 degree configuration results from the coupling mechanism causing panels 204 to be slightly overlapping when shield 200 is in the open configuration, which avoids any gap or ballistically weak line being present at the junction of panels 204 and allows shield 200 to stand upright without additional support, such as legs or buttresses. In addition, each panel may include notched regions and/or cutouts to allow greater visibility to a user. Shield 200 is configured to be carried by a user when not stowed or standing, and thus preferably does not include wheels or similar to facilitate rolling.

In addition, one or more of hinges 208 may include a locking mechanism, such as a secondary hinge, a pin, or other suitable mechanism 219. In this way, panels 204 will remain in the unfolded position when forces are applied to the front of shield 200. Alternatively, a use may leave shield 200 unlocked to allow for flexibility when moving in confined areas.

Each panel 204 includes a grip 212 (e.g., 212a, 212b) and a support 217 (e.g., 217a, 217b). Each grip 212 is positioned near the upper outer corner of each panel 204 and preferably angled with respect to vertical, about 45 degrees for example. Grip 212 is sized and shaped to be grasped by a user's hand. Each grip 212 is preferably angled from vertical between 0 and 90 degrees, and in a preferred embodiment between about 20 and 45 degrees, in order to limit user fatigue.

Slightly beneath each grip 212 and more toward the center of shield 200, each support 217 includes a curved portion that is open on the bottom and sized and designed to fit over a user's forearm. Support 217 is attached to panel 204 via a hinge so that supports 217 may be folded against panel 204 when not in use (as shown in FIG. 7). This allows shield 200 to be folded and allows one support 217 to be folded out of the way when the other support 217 is in use (as shown in FIG. 6). With grip 212 and support 217 on each panel, shield 200 may be held/supported by either a user's left hand/arm or a user's right hand/arm.

In a preferred embodiment, support 217 may be made from a flat bar curved into a J-shape and coupled to a rectangular block, wherein the curved portion is designed to fit over a user's arm. Support 217 is preferably attached to panel 204 by a mechanism that allows support 217 to be pivotable from a stowed position, in which the curved portion of support 217 can be placed against the interior of the panel to which it is attached when not in use (for example, as support 217a is shown in FIG. 6) to an in use position, in which the curved portion extends away from the panel to which it is attached (as support 217b is shown in FIG. 6). The bar is curved toward the operator to allow for easy one-handed pick up of the shield and provides an ergonomic hold for the operator while being easily picked up or released from use. Good ergonomics mean the operator will be less fatigued by shield use over time and thus more effective overall. Easily picking up and putting down the shield means the operator can take action quickly, while still being able to drop the shield when necessary. The book or curved portion may be relatively wide (but no so wide as to interfere with operation of the shield when not in use or folding of the shield) and may be padded with foam or similar soft material to make holding the shield for long periods comfortable, and can be coated with anti-slip material to help better maintain the hook in position on the user's forearm.

Preferably, the grips, supports, and hinges are attached to the panels with no fewer than three attachment points so that in the event of damaged to one attachment point, the component will remain functional for the user.

Further, shield 200 may be hung on a vehicle door, for example, by extending the curved portions of both support 217a and 217b to an approximately perpendicular position from panels 204 and hooking them on a vehicle door in order to provide ballistic protection to unarmored vehicles.

In addition, shield 200 may include a mounting strap 218 (e.g., 218a, 218b) for supporting items such as flashlights, cameras, or supplies. In this way, items that may otherwise be carried by an officer can be placed on either the inside or outside of shield 200. Mounting strap 218 may be made of any suitable material, such as two pieces of webbing or plastic laying atop each other and wrapping around the shield front to back. The two materials are joined to each other at regular intervals, creating loops in which accessories may be placed. This allows officers to choose the accessories for each particular situation and/or to easily replace accessories (such as when the batteries in a light lose power).

In the folded configuration, shield 200 may be as little as 2-4 inches in width (i.e., the distance separating the panels as the inside or rear portions face each other), in part because offset hinges 208 allow opposing grips 212 and supports 217 to not interfere with the folding; that is, the outer portions of opposing members do not directly lineup with each other when the shield is in the folded configuration. As can be seen in FIG. 9, which is a top view of shield 200 in the folded configuration, the faces of grips 212 do not abut when shield 200 is folded, which allows for a narrower profile. In addition, because of the arrangement of grips 212 and supports 217, the faces of grips 212 will contact the inside face of opposing panel 204 when shield 200 is in the folded configuration (as can be seen in FIG. 9).

In addition, when shields of the present invention are in the open configuration, the shield may be self-supporting when placed on a substantially horizontal surface to provide ballistic protection while a user is waiting or resting behind the shield. The shield in open configuration may also be attached to a vehicle door to provide occupant protection in non-hardened vehicles. Further, the ballistic panels may be narrower at the base than at the midpoint and designed such that the lower left and right shield corners do not interfere with the operator's legs as the shield is moved across the body.

As noted, the ballistic panels may be locked into the unfolded position to keep the shield in its operational configuration by a secondary hinge, a pin, or other suitable mechanism.

The edges of the panels are optionally covered with a non-slip material in order to assist in steadying a light or weapon.

The shield of the present invention may include panels for any desired level of protection, including for various ballistic resistance, stab protection, and thrown object.

Depending on the thickness of panels 104/204, a bevel on the inside edge of panels 104/204 may be included to facilitate placing the shield in the open configuration. A panel that is rifle rated, for example, may be about one inch thick, in which case a bevel (e.g., bevel 105 on panel 104*b* as shown in FIG. 3) may be included. Thinner panels, such as those that are pistol rated and may be about % inch thick, in which case a bevel may not be needed (as shown in FIG. 7).

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A folding shield comprising:
    a first panel having a first user-facing face, a first top edge, a first bottom edge, a first outward edge and a first inward edge, the first panel including a first grip handle and a first arm support, the first arm support being attached to the first panel below the first grip handle and including a first curved portion, wherein the first curved portion is pivotable between a first stowed position in which the first curved portion is aligned with the first user-facing face and a first use position in which the first curved portion extends away from the first user-facing face, and wherein the first grip handle is not horizontal when the shield is in an upright position;
    a second panel having a second user-facing face, a second top edge, a second bottom edge, a second outward edge, and a second inward edge, the second panel including a second grip handle and a second arm support, the second arm support being attached to the second panel below the second grip handle and including a second curved portion, wherein the second curved portion is pivotable between a second stowed position in which the second curved portion is aligned with the second user-facing face and a second use position in which the second curved portion extends away from the second user-facing face, and wherein the second grip handle is not horizontal when the shield is in the upright position; and
    a plurality of offset coupling devices connecting the first inward edge to the second inward edge such that the shield is continuously foldable between an open configuration in which an angle between the first panel and the second panel is more than 100 degrees and less than 180 degrees and a folded configuration in which the first user-facing face and the second user-facing face are facing each other,
    wherein the second arm support and the first grip handle are configured and positioned such that, when the shield is in the open configuration and the second arm support is in the second use position, when a user grasps the first grip handle with the user's right hand the second arm support is configured to be placed over the user's right arm to further support the shield and wherein the first arm support and the second grip handle are configured and positioned such that, when the shield is in the open configuration and the first arm support is in the first use position, when the user grasps the second grip with the user's left hand the first arm support is configured to be placed over the user's left arm to further support the shield.

2. The folding shield of claim 1, further including a locking mechanism for locking the shield in the open configuration.

3. The folding shield of claim 2, wherein when the shield is in the open configuration and the first curved portion is in the first use position and the second curved portion is in the second use position, the shield is configured to be attached to a vehicle door.

4. The folding shield of claim 1, wherein, when the shield is in the open configuration, the first inward edge and the second inward edge overlap.

5. The folding shield of claim 1, wherein, when the shield is in the open configuration, the shield is self-supporting in the upright position when placed on a substantially horizontal surface.

6. The folding shield of claim 1, further including a first mounting strap running horizontally across the first panel and a second mounting strap running horizontally across the second panel.

7. The folding shield of claim 1, wherein, when the shield is in the folded configuration, the plurality of offset coupling devices are configured such that the first grip handle and the second grip handle do not inhibit the degree of folding by coming into contact with each other.

8. The folding shield of claim 7, wherein when the shield is in the folded configuration with the first curved portion in the first stowed position and the second curved portion in the second stowed position, the shield is less than 5 inches wide.

9. The folding shield of claim 8, wherein the shield is less than 3 inches wide in the folded configuration.

10. A folding shield comprising:
   a first panel having a first inside edge, a first front side, and a first back side, the first panel including a right-hand grip attached to the first back side and a left arm support hingeably attached to the first back side; and
   a second panel having a second inside edge, a second front side, and a second back side, the second panel including a left-hand grip attached to the second back side and a right arm support hingeably attached to the second back side,
   wherein the first panel and the second panel are coupled along the first inside edge and the second inside edge via a plurality of offset hinges such that the folding shield is configurable between an open configuration in which an angle between the first panel and the second panel is greater than 100 degrees and up to 180 degrees and a folded configuration in which the first back side and the second back side face each other and are separated by less than 5 inches.

11. The folding shield of claim 10, wherein the right-hand grip contacts the second back side of the second panel and the left-hand grip contacts the first back side of the first panel when the shield is in the folded configuration.

12. The folding shield of claim 11, wherein the left arm support includes a first curved portion, wherein the first curved portion is pivotable between a first stowed position in which the first curved portion is aligned with the first back side and a first use position in which the first curved portion extends away from the first back side and wherein the right arm support includes a right arm support curved portion, wherein the right arm support curved portion is pivotable between a second stowed position in which the right arm support curved portion is aligned with the second back side and a second use position in which the right arm support curved portion extends away from the second back side.

13. The folding shield of claim 12, wherein the left arm support and the left-hand grip are configured and positioned such that, when the shield is in the open configuration and the left arm support is in the first use position, when a user grasps the left-hand grip with the user's left hand the left arm support is configured to be placed over the user's left arm to further support the shield and wherein the right arm support and the right-hand grip are configured and positioned such that, when the shield is in the open configuration and the right arm support is in the second use position, when the user grasps the right-hand grip with the user's right hand the right arm support is configured to be placed over the user's right arm to further support the shield.

14. The folding shield of claim 10, further including a locking mechanism for locking the folding shield in the open configuration.

15. The folding shield of claim 10, wherein, when the shield is in the open configuration, the first panel and the second panel partially overlap.

16. The folding shield of claim 10, wherein, when the shield is in the folded configuration, a first forward face of the right-hand grip and a second forward face of the left-hand grip do not abut one another.

17. The folding shield of claim 10, wherein right-hand grip and the left-hand grip are angled between 20 and 45 degrees from vertical.

18. The folding shield of claim 10, wherein the first inside edge is beveled.

19. The folding shield of claim 10, further including a mounting strap on the first panel configured to support accessories on the first panel.

\* \* \* \* \*